US006152325A

United States Patent [19]
Edwards

[11] Patent Number: 6,152,325
[45] Date of Patent: Nov. 28, 2000

[54] INTEGRATED TUBING ASSEMBLY FOR BEVERAGE DISPENSERS

[75] Inventor: William A. Edwards, Lavernia, Tex.

[73] Assignee: Lancer Partnership, Ltd., San Antonio, Tex.

[21] Appl. No.: 09/267,170

[22] Filed: Mar. 12, 1999

[51] Int. Cl.[7] .......... G01F 11/00

[52] U.S. Cl. .......... 222/1; 222/146.6; 62/396; 62/389

[58] Field of Search .......... 222/146.6, 129.1, 222/1; 62/396, 389; 165/154

[56] References Cited

U.S. PATENT DOCUMENTS

| | | | |
|---|---|---|---|
| 1,969,643 | 8/1934 | Fuchs et al. | 62/389 |
| 2,159,729 | 5/1939 | Ribble | 62/389 |
| 2,435,034 | 1/1948 | Chisholm | 62/389 |
| 2,674,106 | 4/1954 | Hill | 62/389 |
| 3,333,318 | 8/1967 | Jaeger | 165/154 |
| 4,676,400 | 6/1987 | Lamont et al. | 222/146.6 |
| 4,730,463 | 3/1988 | Stanfill | 62/389 |
| 4,856,678 | 8/1989 | Stanfill et al. | 222/146.6 |
| 5,397,179 | 3/1995 | Berlin et al. | 165/154 |
| 6,012,514 | 1/2000 | Swain | 165/154 |

*Primary Examiner*—Andres Kashnikow
*Assistant Examiner*—Christopher S. Kim
*Attorney, Agent, or Firm*—Christopher L. Makay; Rafael V. Baca

[57] ABSTRACT

An integrated tubing assembly for carrying fluids through a beverage dispenser system and for uniformly cooling fluids carried therein includes a compound tube with two opposing ends. The compound tube is linked with a first and a second inlet from the beverage dispenser system for receiving fluids therefrom and linked with a first and a second outlet from the beverage dispenser system for delivering fluids thereto. Accordingly, the compound tube includes a core tube in communication with the first inlet at one end and with the first outlet at the opposing end for carrying fluids therethrough. The compound tube further includes an outer tube in communication with the second inlet at one end and in communication with the second outlet at the opposing end for carrying fluids therethrough. As such, the outer tube is annularly disposed about the core tube.

12 Claims, 2 Drawing Sheets

INTEGRATED TUBING ASSEMBLY FOR BEVERAGE DISPENSERS

BACKGROUND OF THE INVENTION

1. Field of the Invention

The present invention generally relates to dispensing equipment and, more particularly, but not by way of limitation, to an integrated tubing assembly for a beverage dispenser with a plurality of integrally linked tubes for delivering fluids therethrough.

2. Description of the Related Art

Beverage dispenser systems often dispense a beverage flavored syrup mixed with either plain water to form a drink, such as punch, or carbonated water to form a carbonated drink, such as cola. Beverage dispenser systems often include cooling units for cooling plain and carbonated water as well as beverage flavored syrup prior to forming a desired beverage in that it is highly desirable in the industry to serve carbonated drinks at the coldest temperature possible.

Typically, beverage dispenser systems feature separate lines for passing plain water, carbonated water, and beverage flavored syrup through a cooling unit to cool each respective fluid prior to beverage formation. A plain water line delivers water from a plain water source, such as a public water line, across the cooling unit to a beverage dispenser system's dispensing valves where water is typically combined with beverage flavored syrup to form a drink. A carbonated water line delivers carbonated water from a carbonator, across the cooling unit to the dispensing valves where carbonated water is combined with beverage flavored syrup to form a carbonated drink. Accordingly, a beverage flavored syrup line delivers beverage flavored syrup from a beverage flavored syrup source, across the cooling unit to the dispensing valves. It should also be added that beverage flavored syrup and plain water are often at ambient temperature prior to entering a beverage dispenser system.

Current cooling unit design, however, does not uniformly cool each respective fluid prior to entering the dispensing valves. In particular, for example, beverage flavored syrup is more dense than plain water and, thus, requires a longer cooling period to obtain a desired temperature than plain water to reach that identical temperature. As such, current cooling units do not compensate for this longer cooling period for denser fluids when cooling the plain water line, the carbonated water line, and the beverage syrup line therein. Consequently, warmer beverage fluids greatly compromise the beverage formation process and, ultimately, the overall taste of a desired beverage. For example, warmer beverage flavored syrup or carbonated water induces excessive, unwanted foaming while a desired beverage is being formed at the dispensing valves. Thus, in addition to making an unsightly mess, excessive foaming gives rise to unfavorably "flat" tasting carbonated drinks.

Accordingly, there is a long felt need for uniformly cooling each fluid within the plain water, carbonated water, and beverage flavored syrup lines prior to entering a beverage dispenser system's dispensing valves to enhance the process for forming a desired beverage dispensed therefrom.

SUMMARY OF THE INVENTION

In accordance with the present invention, an integrated tubing assembly for a beverage dispenser system, includes a compound tube with two opposing ends. The compound tube is linked with a first and a second inlet from the beverage dispenser system for receiving fluids therefrom and linked with a first and a second outlet from the beverage dispenser system for delivering fluids thereto. Accordingly, the compound tube includes a core tube in communication with the first inlet at one end and with the first outlet at the opposing end for carrying fluids therethrough. The compound tube further includes an outer tube in communication with the second inlet at one end and in communication with the second outlet at the opposing end for carrying fluids theretherough. As such, the outer tube is annularly disposed about the core tube. Other embodiments contemplate a compound tube including a plurality of outer tubes annularly disposed about the core tube.

The integrated tubing assembly further includes a core tube passageway formed by the core tube and an outer tube passageway formed by the outer tube, each passageway for carrying fluids therethrough. One embodiment contemplates the outer tube passageway formed by a narrow gap between the outer tube and the core tube, thereby allowing for a thin layer of fluid to flow therethrough. In effect, the outer tube passageway facilitates heat transfer between fluids carried therethrough and the beverage dispenser system and with the core tube as well.

The integrated tubing assembly includes a fitting device disposed on each opposing end of the compound tube for coupling the integrated tubing assembly with the beverage dispenser system. Moreover, each fitting device is designed to ensure proper flow of beverage fluids between the core and outer tube passageways and the beverage dispenser system.

In accordance with the present invention, a method for carrying fluids through a beverage dispenser system includes linking an integrated tubing assembly with a first inlet and a second inlet from the beverage dispenser system for receiving fluids therefrom and with a first outlet and a second outlet from the beverage dispenser system for delivering fluids thereto. Fluids thus pass from the first inlet, through a core tube, to the first outlet and from the second inlet, through an outer tube, to the second outlet. In a similar manner, other methods contemplate linking an integrated tubing assembly with a compound tube that includes a plurality of outer tubes annularly disposed about the core tube. As such, beverage fluids pass through the plurality of outer tubes.

It is therefore an object of the present invention to provide an integrated tubing assembly and associated method for carrying fluids through a beverage dispenser system and for uniformly cooling each fluid within the beverage dispenser system to enhance the process for forming a desired beverage dispensed.

It is a further object of the present invention to provide an integrated tubing assembly for a beverage dispenser with a plurality of integrally linked tubes for facilitating heat transfer and for delivering fluids therethrough.

Still other objects, features, and advantages of the present invention will become evident to those skilled in the art in light of the following.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. The figures are not necessarily to scale, and some features may be exaggerated to show details of particular components or steps.

Figure 1:
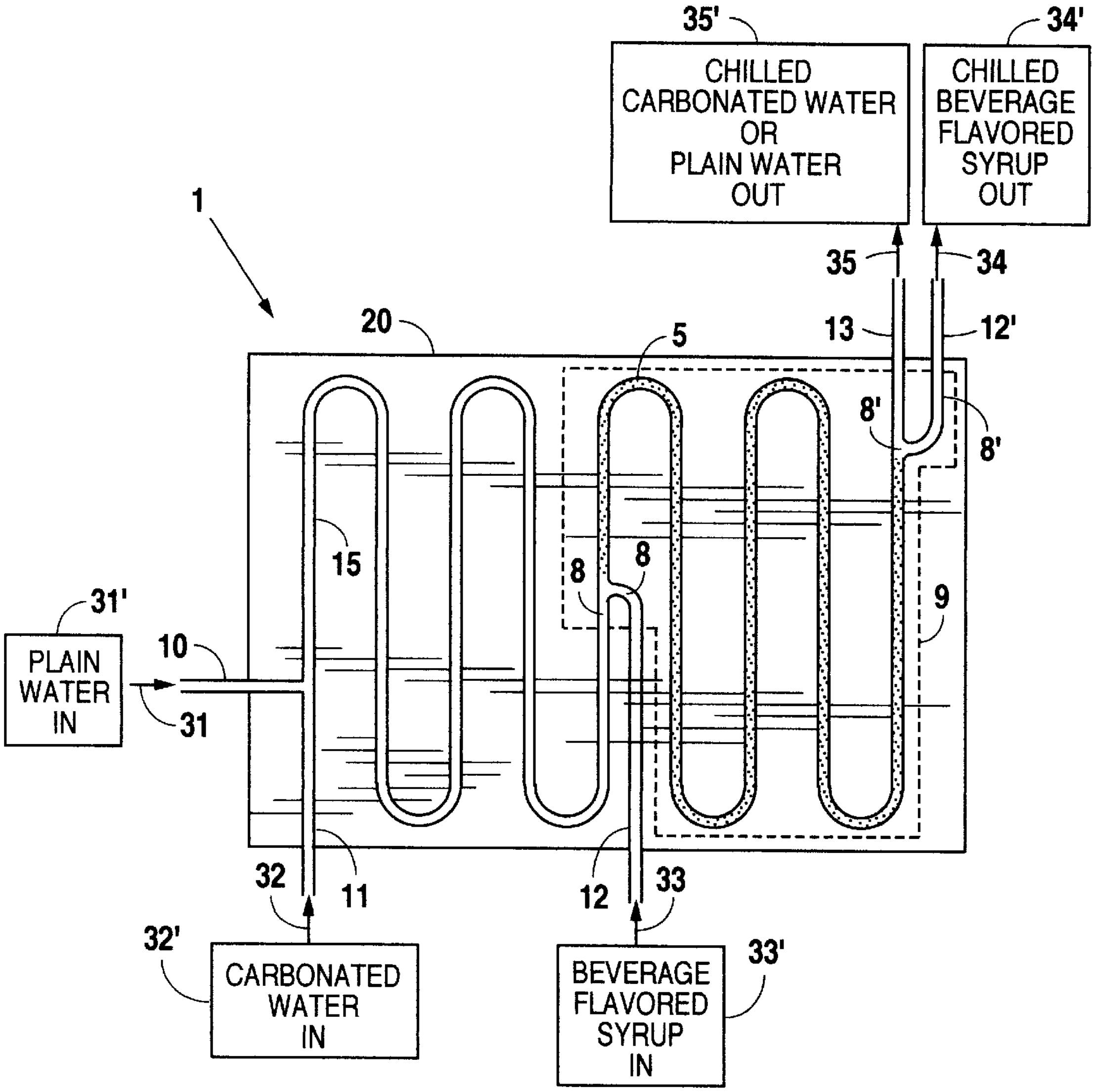
FIG. 1 is a top elevation and partially schematic view illustrating a cooling unit from a beverage dispenser system coupled with an integrated tubing assembly as is preferred.
Figure 2:
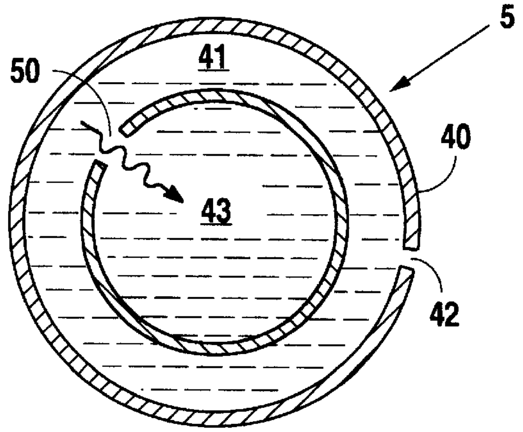
FIG. 2 is a side view, in cross-section, illustrating a compound line from an integrated tubing assembly according to the preferred embodiment for carrying fluids therethrough.

As illustrated in FIG. 1 a beverage dispenser system 1 in the preferred embodiment features an integrated tubing assembly 9 coupled with and in cooperative engagement with a cooling unit 20. Although coupling an integrated tubing assembly with a cooling unit is preferred, those skilled in the art will recognize that an integrated tubing assembly may be utilized throughout an entire beverage dispenser system for carrying fluids therethrough. Additionally, cooling unit 20 includes a standard cooling unit for beverage dispensers, such as a cold plate, shown in FIG. 1, or a cooling fluid bath within a cooling chamber, shown in FIG. 3.

In FIG. 1, cooling unit 20 includes a plain/carbonated water line 15. Cooling unit 20 further includes a plain water inlet line 10 and/or a carbonated water inlet line 11 for receiving plain and/or carbonated water, respectively. The plain water inlet line 10 and/or the carbonated water inlet line 11 are each linked with the plain/carbonated water line 15 to provide the plain/carbonated water line 15 with either plain or carbonated water. Plain water is thus directed from a plain water source (not shown), across the plain water inlet line 10, and to the plain/carbonated water line 15 according to directional arrow 31. Carbonated water is directed from a carbonated water source (not shown), across the carbonated water inlet line 11, and to the plain/carbonated water line 15 according to directional arrow 32. The plain water and carbonated water are at ambient temperature prior to entering beverage dispenser system 1.

It should be emphasized that the overall length of the plain/carbonated water line 15 as well as the distance between the plain/carbonated water line 15 and the cooling unit 20 may be varied to optimally facilitate heat transfer to the plain or carbonated water flowing within the plain/carbonated water line 15. Moreover, the plain/carbonated water line 15 may be of any size, shape, and spatial configuration, such as a helical or a serpentine configuration, necessary to facilitate optimum heat transfer and, in this preferred embodiment, is constructed from any suitable material, such as metal or hard plastic.

In operation, either plain or carbonated water is delivered though the plain/carbonated water line 15 according to whether a consumer has selected a beverage requiring plain water, such as punch, or carbonated water, such as cola. If punch is desired, for example, an inward flow of plain water, shown as 31', is required by the plain/carbonated water line 15 of cooling unit 20. If cola is desired, an inward flow of carbonated water, shown as 32', is required by the plain/carbonated water line 15.

As shown in FIGS. 1–4, the preferred integrated tubing assembly 9 includes a compound line 5 for delivering beverage flavored syrup as well as plain or carbonated water therethrough. In this preferred embodiment, compound line 5 includes a core tube 42 and an outer tube 40 annularly disposed about the core tube 42. It must be emphasized that the word "annularly", as used in this description and in the appended claims, refers to at least one tube positioned within another and, although not necessarily sharing a common central axis, defining a space therebetween. Although the preferred compound tube 5 maintains a configuration with two tubes, i.e. the core tube 42 and the outer tube 40, those skilled in the art will recognize that a compound tube with any number of successive tubes annularly disposed about a core tube can be utilized so as to sufficiently enhance the process for forming a desired beverage.

Moreover, the overall length of the compound tube 5 as well as the distance between the compound tube 5 and the cooling unit 20 may be varied to optimally facilitate heat transfer to fluids flowing within the compound tube 5. The compound tube 5 may be of any size, shape, and spatial configuration, such as a helical or a serpentine configuration, necessary to facilitate optimum heat transfer and, in this preferred embodiment, is constructed from any suitable material, such as metal or hard plastic.

Compound tube 5 includes inlets 8 for allowing fluid to enter the compound tube 5 therethrough and outlets 8' for allowing fluid to exit the compound tube 5 therethrough. In the preferred embodiment, inlets 8 include a first inlet coupled with the plain/carbonated water line 15 for receiving plain or carbonated water therethrough and a second inlet coupled with a beverage flavored syrup inlet line 12 for receiving beverage flavored syrup therethrough.

As such, in this preferred embodiment, beverage flavored syrup is directed from a beverage flavored syrup source (not shown), across the beverage flavored syrup inlet line 12, and to the second inlet of compound tube 5 according to directional arrow 33. Beverage flavored syrup is normally at ambient temperature prior to entering beverage dispenser system 1.

The preferred outlets 8' include a first outlet coupled with a beverage flavored syrup outlet line 12'. The first outlet delivers a supply of beverage flavored syrup, uniformly chilled by cooling unit 20, to the beverage flavored syrup outlet line 12'. According to directional arrow 34, the beverage flavored syrup outlet line 12' thus provides the uniformly chilled beverage flavored syrup to the beverage dispenser system 1 for use in the beverage formation process.

The preferred outlets 8' include a second outlet coupled with a plain/carbonated water outlet line 13. The second outlet delivers a supply of plain or carbonated water, uniformly chilled by cooling unit 20, to plain/carbonated water outlet line 13. According to directional arrow 35, the plain/carbonated water outlet line 13 thus provides the uniformly chilled plain or carbonated water to the beverage dispenser system 1 for use in the beverage formation process.

Furthermore, the preferred compound tube 5 includes an outer tube passageway 41 defined by the space between the core tube 43 and the outer tube 40 for delivering beverage flavored syrup therethrough. The preferred compound tube 5 includes a core tube passageway 43 defined by the core tube 42 for delivering plain or carbonated water therethrough.

Accordingly, beverage flavored syrup flowing within the outer tube passageway 41 is subjected to a dual heat transfer effect. The dual heat transfer effect sufficiently cools the denser beverage flavored syrup prior to entering a beverage dispenser system's dispensing valves so that, upon entry, the beverage flavored syrup exhibits a uniform temperature to that of the less dense plain or carbonated water. By establishing this uniform temperature prior to entering the dispensing valves, the dual heat transfer effect sufficiently mitigates the adverse effects associated with using warm beverage fluids for the beverage formation process, such as excessive foaming. Ultimately, the dual heat transfer effect provided by an integrated tubing assembly thus enhances the overall taste of a desired beverage. As such, the outer tube passageway 41 establishes a greater surface area for heat transfer to occur within the compact configuration of the compound tube 5 in that the beverage flavored syrup transfers heat through both the outer tube 40 and the core tube 42, hence a "dual" heat transfer effect. Additionally, the dual heat transfer effect enables a compound tube to be integrated with a compact beverage dispenser system configuration, whereby compactness is a highly desirable design characteristic in the industry.

In particular, heat is first transferred from the outer tube passageway 41 between the warmer beverage flavored syrup and the cooler cooling unit 20 such that heat travels through the outer tube 40 and is absorbed by the cooling unit 20. Second, according to directional arrow 50 in FIG. 2, heat is transferred from the outer tube passageway 41 between the warmer beverage flavored syrup and the cooler plain or carbonated water within the core tube passageway 43 such that heat travels through the core tube 42 and is absorbed by the plain or carbonated water, and, thus, completing the dual heat transfer effect. Furthermore, the rate of cooling for beverage flavored syrup is greatly enhanced while within the outer tube passageway 41. Specifically, because plain or carbonated water is less dense than beverage flavored syrup, as cooler plain or carbonated water travels at a relatively faster rate within the core tube passageway 43, heat from the slow moving beverage flavored syrup is quickly absorbed and carried away by the fast moving stream of plain or carbonated water. To optimize the dual heat transfer effect, it is essential that the outer tube passageway 41 be defined by a short distance between the outer tube 40 and the core tube 42, referred herein as a "narrow gap", thereby allowing for a thin layer of beverage flavored syrup to flow through the outer tube passageway 41.

In operation, ambient temperature beverage flavored syrup is drawn through the beverage flavored syrup inlet line 12 to the first inlet of compound tube 5. Beverage flavored syrup is directed from the first inlet to the outer tube passageway 41 and, thus, flows across compound tube 5 via the outer tube passageway 41. Within the compound tube 5, the beverage flavored syrup is subjected to the dual heat transfer effect for enhancing the beverage formation process whereby the beverage flavored syrup is cooled to a temperature uniform to that of plain or carbonated water. Beverage flavored syrup is directed from the outer tube passageway 41 to the beverage flavored syrup outlet line 12' via the first outlet of compound tube 5. An outward flow of uniformly chilled beverage flavored syrup, shown as 34' in FIG. 1, is introduced to the beverage dispenser system 1 to, ultimately, enhance the overall taste of a desired beverage.

In a similar manner, either plain or carbonated water is drawn though the plain/carbonated water line 15 according to whether a consumer has selected a beverage requiring plain water or carbonated water. To facilitate the dual heat transfer effect pursuant to directional arrow 50, the plain/carbonated water line 15 of cooling unit 20 sufficiently cools the plain or carbonated water flowing therethrough prior to entering compound tube 5. Thus, upon entering the second inlet of compound tube 5, plain or carbonated water is directed to the core tube passageway 43 and flows across compound tube 5 via the core tube passageway 43. While flowing through core tube passageway 43, plain or carbonated water is sufficiently cooled so that heat is thermodynamically drawn and absorbed by the plain or carbonated water from the warmer beverage flavored syrup flowing through the adjacent outer tube passageway 41 of compound tube 5. Plain or carbonated water is directed from the core tube passageway 43 to the plain/carbonated water outlet line 13 via the second outlet of compound tube 5. An outward flow of uniformly chilled plain or carbonated water, shown as 35', is introduced to the beverage dispenser system 1 to, ultimately, enhance the overall taste of a desired beverage.

Figure 3:
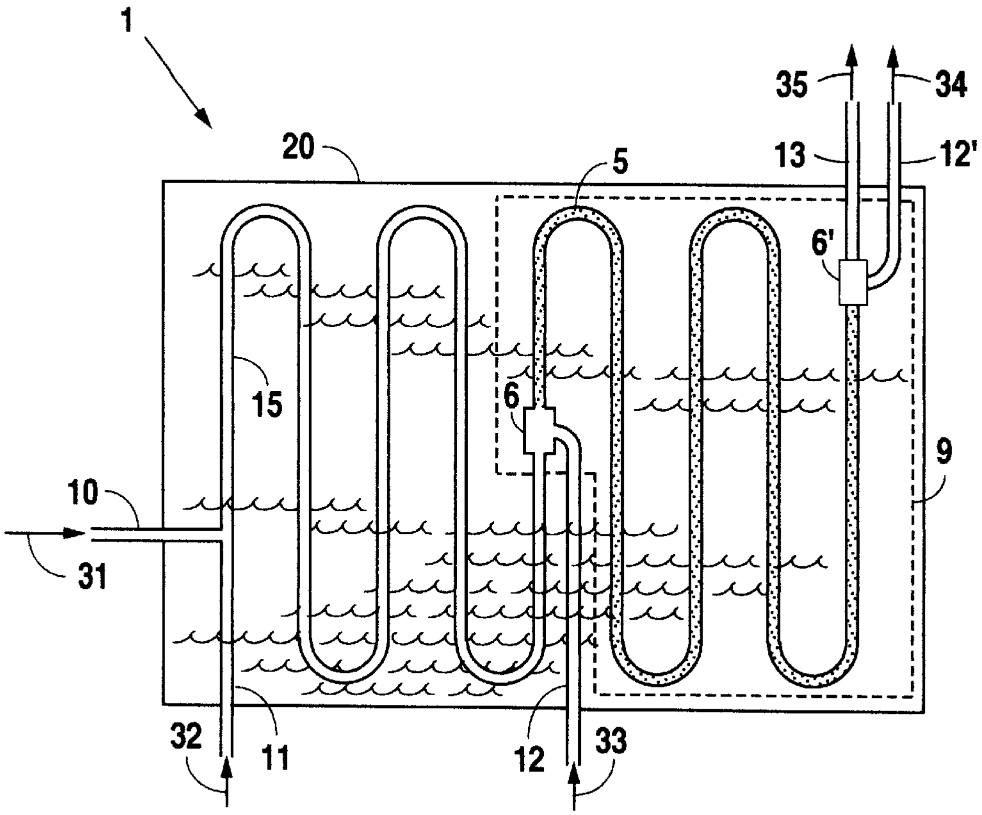
FIG. 3 is a top elevation view illustrating an integrated tubing assembly coupled with a cooling unit, wherein the integrated tubing assembly according to the preferred embodiment features a pair of fitting devices for coupling a compound line from the integrated tubing assembly with the cooling unit.
Figure 4:
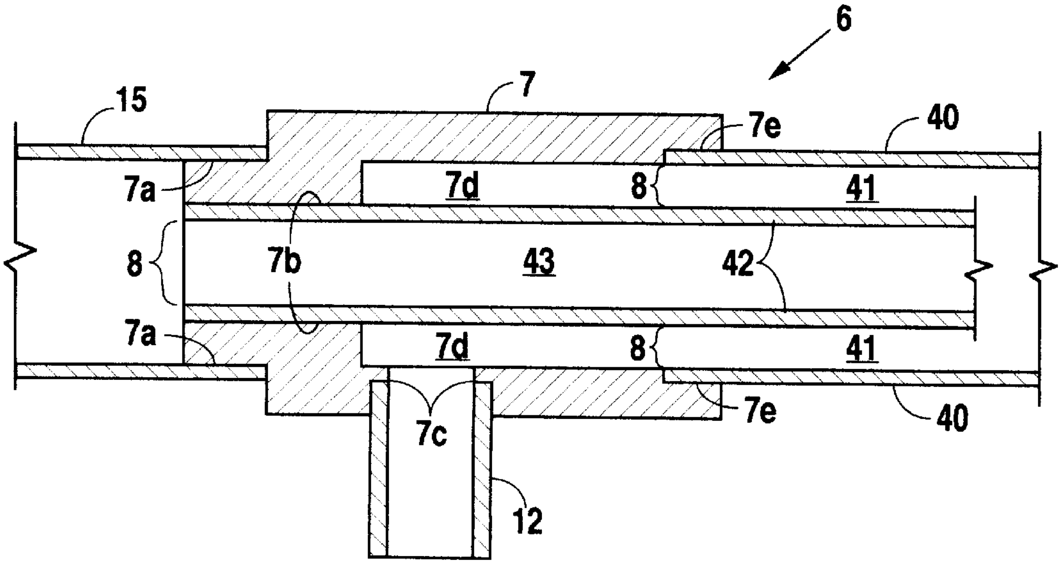
FIG. 4 is a side view, in cross-section, illustrating a preferred fitting device for coupling a compound line with a cooling unit.

As shown in FIGS. 3–4, the integrated tubing assembly 9 further includes a fitting device 6 for coupling the compound line 6 with the cooling unit 20. In the preferred embodiment, fitting device 6 includes a body 7. Body 7, in turn, preferably defines mounting surfaces **7*a*, 7*b*, 7*c*, and 7*e* adapted to engage using suitable means, such as welding, friction, or press fitting, with the plain/carbonated water line 15, the beverage flavored syrup inlet line 12 as well as the core tube 42 and the outer tube 40 of compound tube 5. In particular, the plain/carbonated water line 15 engages with the mounting surface 7*a* to thus secure the plain/carbonated water line 15 with the fitting device 6. Moreover, core tube 42 frictionally engages with mounting surface 7*b* to secure the core tube 42 with the fitting device 6, whereby core tube 42 is in communication with the plain/carbonated water line 15 to allow plain or carbonated water to pass from the plain/carbonated water line 15 to the core tube 42 via fitting device 6**.

Beverage flavored syrup inlet line 12 engages with mounting surface **7*c* to thus secure the beverage flavored syrup inlet line 12 with the fitting device 6. The outer tube 40 engages with the mounting surface 7*e* to secure the outer tube 40 with the fitting device 6. Accordingly, body 7 defines an annular bridging cavity 7*d* disposed between and in operative engagement with the beverage flavored syrup inlet line 12 and the outer tube 40 on body 7, whereby beverage flavored syrup flows from the beverage flavored syrup inlet line 12, across the annular bridging cavity 7*d* to the outer tube 40**.

FIG. 3 shows an integrated tubing assembly 9 including a compound tube 5 and fitting devices 6 and 6' in cooperative engagement with compound tube 5, as is preferred. Specifically, fitting device 6 directs plain or carbonated water from the plain/carbonated water line 15 and directs beverage flavored syrup from the beverage flavored syrup inlet line 12 to core passageway 43 and outer tube passageway 41 of compound tube 5, respectively. Fitting device 6' is structurally identical to fitting device 6 but achieves an opposite effect in that fitting device 6' directs plain or carbonated water from core passageway 43 and directs beverage flavored syrup from outer tube passageway 41 to the plain/carbonated water outlet line 13 and the beverage flavored syrup outlet line 12', respectively. It should be added that, although the preferred fitting device 6 maintains a configuration for facilitating fluid flow within the core tube 42 and within the outer tube 40 of compound tube 5, those skilled in the art will recognize that a fitting device which accommodates a compound tube with any number of successive tubes annularly disposed about a core tube can be utilized so as to sufficiently enhance the process for forming a desired beverage.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. A beverage dispenser system, comprising:

a cooling unit;

a beverage syrup inlet line disposed in the cooling unit and including an inlet for receiving beverage syrup from a beverage syrup source;

a carbonated water inlet line disposed in the cooling unit and including an inlet for receiving carbonated water from a carbonated water source;

a compound tube disposed in the cooling unit, the compound tube comprising a core tube coupled with the beverage syrup inlet line for receiving beverage syrup therein and an outer tube coupled with the carbonated water inlet line for receiving carbonated water therein, wherein the compound tube facilitates the cooling of the beverage syrup and the carbonated water flowing therethrough to a uniform temperature to reduce undesirable beverage formation effects upon the combination of the beverage syrup and the carbonated water to form a dispensed beverage;

a beverage syrup outlet line coupled with the core tube to receive uniformly cooled beverage syrup therein; and a carbonated water outlet line coupled with the outer tube to receive uniformly cooled carbonated water, whereby the uniformly cooled beverage syrup and carbonated water are ultimately combined to form a dispensed beverage.

2. The beverage dispenser system according to claim 1, further comprising a fitting device disposed on the compound tube for coupling the core tube with the beverage syrup inlet line and the outer tube with the carbonated water inlet line.

3. The beverage dispenser system according to claim 1, further comprising a fitting device disposed on the compound tube for coupling the core tube with the beverage syrup outlet line and the outer tube with the carbonated water outlet line.

4. The beverage dispenser system according to claim 1, wherein the cooling unit comprises a cold plate.

5. The beverage dispenser system according to claim 1, wherein the cooling unit comprises a cooling fluid bath within a cooling chamber.

6. A beverage dispenser system, comprising:

a cooling unit;

a beverage syrup inlet line disposed in the cooling unit and including an inlet for receiving beverage syrup from a beverage syrup source;

a plain water inlet line disposed in the cooling unit and including an inlet for receiving plain water from a plain water source;

a compound tube disposed in the cooling unit, the compound tube comprising a core tube coupled with the beverage syrup inlet line for receiving beverage syrup therein and an outer tube coupled with the plain water inlet line for receiving plain water therein, wherein the compound tube facilitates the cooling of the beverage syrup and the plain water flowing therethrough to a uniform temperature to reduce undesirable beverage formation effects upon the combination of the beverage syrup and the plain water to form a dispensed beverage;

a beverage syrup outlet line coupled with the core tube to receive uniformly cooled beverage syrup therein; and a plain water outlet line coupled with the outer tube to receive uniformly cooled plain water, whereby the uniformly cooled beverage syrup and plain water are ultimately combined to form a dispensed beverage.

7. The beverage dispenser system according to claim 6, further comprising a fitting device disposed on the compound tube for coupling the core tube with the beverage syrup inlet line and the outer tube with the plain water inlet line.

8. The beverage dispenser system according to claim 6, further comprising a fitting device disposed on the compound tube for coupling the core tube with the beverage syrup outlet line and the outer tube with the plain water outlet line.

9. The beverage dispenser system according to claim 6, wherein the cooling unit comprises a cold plate.

10. The beverage dispenser system according to claim 6, wherein the cooling unit comprises a cooling fluid bath within a cooling chamber.

11. A method of forming a dispensed beverage, comprising the steps of:

providing a beverage dispenser system, comprising:

a cooling unit, and a compound tube disposed in the cooling unit, the compound tube comprising a core tube for receiving beverage syrup therein and an outer tube for receiving carbonated water therein;

delivering beverage syrup to the core tube;

delivering carbonated water to the outer tube;

flowing the beverage syrup and the carbonated water through the compound tube, thereby facilitating the cooling of the beverage syrup and the carbonated water to a uniform temperature to reduce undesirable beverage formation effects upon the combination of syrup and the carbonated water to form a dispensed beverage;

combining the uniformly cooled beverage syrup and carbonated water to form the dispensed beverage.

12. A method of forming a dispensed beverage, comprising the steps of:

providing a beverage dispenser system, comprising:

a cooling unit, and a compound tube disposed in the cooling unit, the compound tube comprising a core tube for receiving beverage syrup therein and an outer tube for receiving plain water therein;

delivering beverage syrup to the core tube;

delivering plain water to the outer tube;

flowing the beverage syrup and the plain water through the compound tube, thereby facilitating the cooling of the beverage syrup and the plain water to a uniform temperature to reduce undesirable beverage formation effects upon the combination of syrup and the plain water to form a dispensed beverage;

combining the uniformly cooled beverage syrup and plain water to form the dispensed beverage.

* * * * *